E. W. BULLARD.
BIT BRACE.
APPLICATION FILED SEPT. 13, 1920.
1,388,920.
Patented Aug. 30, 1921.
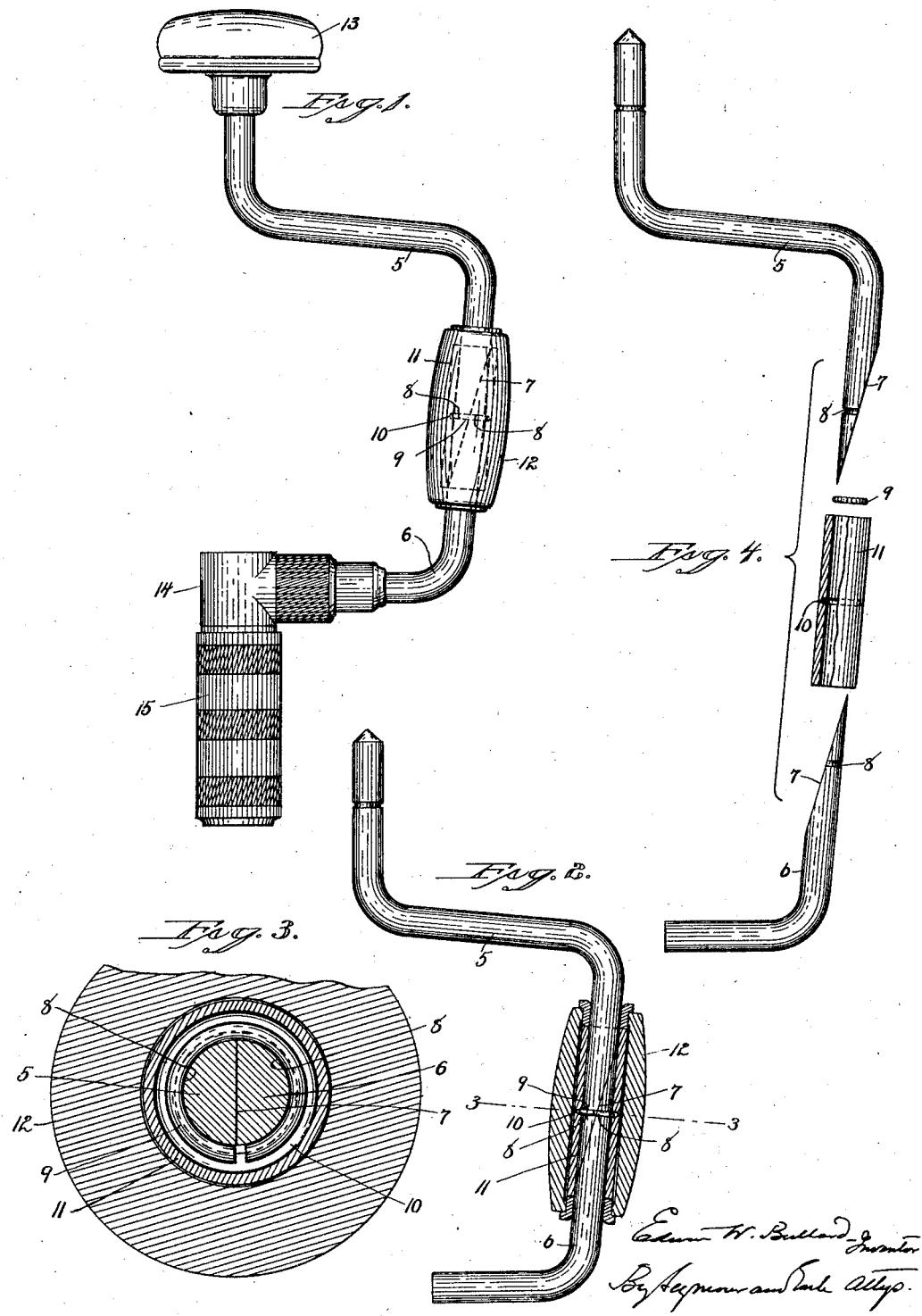

UNITED STATES PATENT OFFICE.

EDWIN W. BULLARD, OF WHITNEYVILLE, CONNECTICUT, ASSIGNOR TO WINCHESTER REPEATING ARMS CO., OF NEW HAVEN, CONNECTICUT, A CORPORATION.

BIT-BRACE.

1,388,920.     Specification of Letters Patent.     Patented Aug. 30, 1921.

Application filed September 13, 1920. Serial No. 409,850.

*To all whom it may concern:*

Be it known that I, EDWIN W. BULLARD, a citizen of the United States, residing at Whitneyville, in the county of New Haven and State of Connecticut, have invented a new and useful Improvement in Bit-Braces; and I do hereby declare the following, when taken in connection with the accompanying drawings, and the characters of reference marked thereon, to be a full, clear, and exact description of the same, and which said drawings constitute part of this application, and represent, in—

Figure 1. A view in side elevation of a bit-brace embodying my invention.

Fig. 2. A detached view in elevation of the two-piece crank of the brace as assembled with the sleeve in section.

Fig. 3. An enlarged cross-sectional view on the line 3—3 of Fig. 2, with the handle omitted.

Fig. 4. A view in elevation of the several parts of the crank prior to being assembled.

My invention relates to an improvement in that class of bit-braces the cranks of which are made in two-parts to provide for the installation of the handle which must be applied to the crank before the same is bent in case the same is made of one piece, the object of my present invention being to provide simple and effective means for fastening together the two parts of a two-part bit-brace crank.

With these ends in view, my invention consists in certain details of construction and combination of parts as will be hereinafter described and particularly pointed out in the claims.

In carrying out my invention as herein shown, the upper and lower parts 5 and 6 of the crank are formed with long corresponding bevels 7 which combine to form what may be termed a spliced joint. The said beveled portions of the parts 5 and 6 are each formed with a corresponding semi-circumferential groove 8 for the partial reception of a resilient split locking-ring 9 also partially entering an internal circumferential groove 10 located midway the length of a coupling-sleeve 11 corresponding in internal diameter to the full diameter of the parts 5 and 6 which are inserted into the opposite ends.

The brace-handle 12 which may be of any approved construction is applied to the sleeve 11 prior to the insertion of the beveled ends of the parts 5 and 6 of the crank thereinto, as described. The upper part 5 of the crank mounts a brace-head 13 while the lower part mounts a chuck-head 14 and chuck 15.

In assembling the parts of my improved bit-brace, the handle 12 is mounted upon the sleeve 11 after which the resilient split ring 9 is crowded into the sleeve 11 until it registers with the internal groove 10 thereof at which time it springs thereinto though not so as to fit snugly into the groove.

The beveled ends 7 of the parts 5 and 6 of the crank are now inserted into the opposite ends of the sleeve until their beveled faces come to a full bearing upon one another at which time the grooves 8 will be brought into registration with the ring 9. Just before the bevels 7 are brought into full bearing, the ring 9 will be slightly expanded into the groove 10 which is made deep enough for this particular purpose. Now as the bevels 7 come fully together and bring the grooves 8 into full registration, the ring will contract until it lies partly in the groove 8 and partly in the groove 10, thus firmly coupling the two parts of the crank together and also the sleeve upon which the handle is mounted.

The character of the brace-handle, brace-head, chuck-head and chuck may be varied as desired, my present invention being characterized by the particular means employed to couple the two parts of a two-part crank.

I claim:

1. A bit-brace having a two part crank, the parts of which have their adjacent ends beveled and each formed with a semi-circumferential groove, a sleeve receiving at its opposite ends the beveled ends of the crank-parts and formed with an internal circumferential groove, and a resilient split ring adapted to lie partly in the groove of the sleeve and partly in the grooves of the beveled ends of the crank-parts, whereby the said parts and the sleeve are coupled together.

2. A bit-brace having a two-part crank, the adjacent ends of the parts of which are correspondingly beveled and each formed with a semi-circumferential groove, a sleeve adapted in diameter to receive the beveled ends of the said parts and formed with an internal circumferential groove, a resilient split ring adapted to enter the said grooves for coupling the two parts of the crank and the sleeve together, and a brace-handle mounted upon the sleeve.

In testimony whereof, I have signed this specification in the presence of two subscribing witnesses.

EDWIN W. BULLARD.

Witnesses:
ERIK S. PALMER,
A. E. HODGSON.